US007956499B2

(12) United States Patent  (10) Patent No.: US 7,956,499 B2
Aiello et al.  (45) Date of Patent: Jun. 7, 2011

(54) MOTOR MAGNETIC FORCE ATTENUATOR (75) Inventors: Anthony J. Aiello, Santa Cruz, CA (US); Klaus D. Kloeppel, Watsonville, CA (US); Paco Flores, Felton, CA (US); Ali Khurram, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/145,347

(22) Filed: Jun. 2, 2005

(65) Prior Publication Data
US 2006/0273674 A1    Dec. 7, 2006

(51) Int. Cl.
H02K 5/24 (2006.01)
(52) U.S. Cl. ......................................................... 310/51
(58) Field of Classification Search .................. 310/51, 310/67 R, 90, 156.04; 130/90
See application file for complete search history.

(56) References Cited

U.S. PATENT DOCUMENTS

| | | | |
|---|---|---|---|
| 1,357,420 A | 11/1920 | Prestwich | |
| 2,048,708 A | 7/1936 | Pfanstiehl | |
| 2,722,463 A | 11/1955 | Shaw et al. | |
| 2,756,115 A | 7/1956 | Michel | |
| 3,146,036 A | 8/1964 | Benatti | |
| 3,238,000 A | 3/1966 | Muijderman et al. | |
| 3,302,048 A | 1/1967 | Gray | |
| 3,399,000 A | 8/1968 | Remmers | |
| 3,494,674 A | 2/1970 | Muijderman et al. | |
| 3,497,273 A | 2/1970 | Muijderman et al. | |
| 3,503,658 A | 3/1970 | Remmers | |
| 3,606,501 A | 9/1971 | Waplington | |
| 3,718,379 A | 2/1973 | Williams et al. | |
| 3,870,382 A | 3/1975 | Reinhoudt | |
| 3,951,234 A | 4/1976 | Fisher | |
| 4,043,612 A | 8/1977 | Orcutt | |
| 4,090,743 A | 5/1978 | Suzuki et al. | |
| 4,200,344 A | 4/1980 | Binns et al. | |
| 4,371,220 A | 2/1983 | Brucher | |
| 4,394,091 A | 7/1983 | Klomp | |
| 4,487,514 A | 12/1984 | Mori | |
| 4,497,307 A | 2/1985 | Paar et al. | |
| 4,515,486 A | 5/1985 | Ide | |
| 4,553,183 A | 11/1985 | Brown et al. | |
| 4,557,610 A | 12/1985 | Asada et al. | |
| 4,573,807 A | 3/1986 | Asada et al. | |
| 4,596,474 A | 6/1986 | Van Roemburg | |
| 4,597,676 A | 7/1986 | Vohr et al. | |

(Continued)

FOREIGN PATENT DOCUMENTS
EP    206516 A2    12/1986
(Continued)

OTHER PUBLICATIONS

Translation for JP 2005-45876.*

(Continued)

*Primary Examiner* — Nguyen N Hanh (57) ABSTRACT

Motors having a magnetic force attenuator are described. In some embodiments, the motors comprise a stationary member having a base and a stator, a rotating assembly having a magnet and a magnetic force attenuator to attenuate the magnetic attraction force between the magnet and the base; and a fluid bearing to support rotation of the rotating assembly relative to the stationary member. The magnetic force attenuator typically comprises a material of high magnetic permeability, and modulates the magnetic attraction force between the magnet and the base of the motor.

39 Claims, 7 Drawing Sheets

U.S. PATENT DOCUMENTS

| | | | |
|---|---|---|---|
| 4,599,664 A | 7/1986 | Schuh | |
| 4,645,960 A | 2/1987 | Hoffman | |
| 4,652,149 A | 3/1987 | Nakaoka et al. | |
| 4,656,545 A | 4/1987 | Kakuta | |
| 4,694,213 A * | 9/1987 | Gowda et al. | 310/90 |
| 4,696,584 A | 9/1987 | Tielemans | |
| 4,698,542 A | 10/1987 | Muller | |
| 4,706,143 A | 11/1987 | Asada et al. | |
| 4,710,034 A | 12/1987 | Tittizer et al. | |
| 4,739,427 A | 4/1988 | Kilmer et al. | |
| 4,798,476 A | 1/1989 | Sakatani et al. | |
| 4,922,406 A | 5/1990 | Schuh | |
| 4,998,033 A | 3/1991 | Hisabe et al. | |
| 5,012,359 A | 4/1991 | Kohno et al. | |
| 5,018,881 A | 5/1991 | Asada | |
| 5,052,822 A | 10/1991 | Van Beek | |
| 5,054,297 A | 10/1991 | Furuhama | |
| 5,067,528 A | 11/1991 | Titcomb et al. | |
| 5,089,732 A | 2/1992 | Konno et al. | |
| 5,112,141 A | 5/1992 | Asada et al. | |
| 5,112,142 A | 5/1992 | Titcomb et al. | |
| 5,142,173 A | 8/1992 | Konno et al. | |
| 5,193,084 A | 3/1993 | Christiaens | |
| 5,209,631 A | 5/1993 | Bernhardt | |
| 5,210,665 A | 5/1993 | Nishizawa | |
| 5,224,782 A | 7/1993 | Miwa et al. | |
| 5,246,294 A | 9/1993 | Pan | |
| 5,271,677 A | 12/1993 | Sherman et al. | |
| 5,283,491 A | 2/1994 | Jabbar | |
| 5,357,163 A | 10/1994 | Minakuchi et al. | |
| 5,358,339 A | 10/1994 | Konno et al. | |
| 5,379,169 A | 1/1995 | Sanada | |
| 5,423,612 A | 6/1995 | Zang et al. | |
| 5,426,548 A | 6/1995 | Fujii et al. | |
| 5,430,590 A | 7/1995 | Ainslie et al. | |
| 5,448,120 A | 9/1995 | Schaule et al. | |
| 5,469,008 A | 11/1995 | Nakajima et al. | |
| 5,471,104 A | 11/1995 | Toshimitsu | |
| 5,487,608 A | 1/1996 | Leuthold et al. | |
| 5,488,521 A | 1/1996 | Lemke et al. | |
| 5,500,780 A | 3/1996 | Boutaghou et al. | |
| 5,504,637 A | 4/1996 | Asada et al. | |
| 5,516,212 A | 5/1996 | Titcomb | |
| 5,533,811 A | 7/1996 | Polch et al. | |
| 5,536,088 A | 7/1996 | Cheever et al. | |
| 5,538,347 A | 7/1996 | Itoh et al. | |
| 5,543,984 A | 8/1996 | Itoh | |
| 5,558,445 A | 9/1996 | Chen et al. | |
| 5,559,382 A | 9/1996 | Oku et al. | |
| 5,559,651 A | 9/1996 | Grantz et al. | |
| 5,577,842 A | 11/1996 | Parsoneault et al. | |
| 5,579,579 A | 12/1996 | Chen | |
| 5,590,003 A | 12/1996 | Dunfield et al. | |
| 5,598,047 A | 1/1997 | Sakuragi et al. | |
| 5,623,382 A | 4/1997 | Moritan et al. | |
| 5,647,672 A | 7/1997 | Fukutani | |
| 5,653,540 A | 8/1997 | Heine et al. | |
| 5,658,080 A | 8/1997 | Ichiyama | |
| 5,659,445 A | 8/1997 | Yoshida et al. | |
| 5,664,889 A | 9/1997 | Gustafson | |
| 5,666,716 A | 9/1997 | Parsoneault et al. | |
| 5,668,427 A | 9/1997 | Morita | |
| 5,678,929 A | 10/1997 | Parsoneault et al. | |
| 5,683,183 A | 11/1997 | Tanaka et al. | |
| 5,685,647 A | 11/1997 | Leuthold et al. | |
| 5,697,708 A | 12/1997 | Leuthold et al. | |
| 5,707,154 A | 1/1998 | Ichiyama | |
| 5,710,678 A | 1/1998 | Leuthold et al. | |
| 5,715,116 A | 2/1998 | Moritan et al. | |
| 5,723,927 A | 3/1998 | Teshima | |
| 5,738,446 A | 4/1998 | Ghosh et al. | |
| 5,778,948 A | 7/1998 | Gomyo et al. | |
| 5,791,785 A | 8/1998 | Nose et al. | |
| 5,795,074 A | 8/1998 | Rahman et al. | |
| 5,806,987 A | 9/1998 | Nose et al. | |
| 5,810,479 A | 9/1998 | Miyasaka et al. | |
| 5,822,846 A | 10/1998 | Moritan et al. | |
| 5,828,795 A | 10/1998 | Miyakoshi et al. | |
| 5,871,285 A | 2/1999 | Wasson | |
| 5,873,657 A | 2/1999 | Lee | |
| 5,876,124 A | 3/1999 | Zang et al. | |
| 5,885,005 A | 3/1999 | Nakano et al. | |
| 5,894,868 A | 4/1999 | Wuester, Sr. | |
| 5,907,456 A | 5/1999 | Khan et al. | |
| 5,908,247 A | 6/1999 | Leuthold et al. | |
| 5,914,832 A | 6/1999 | Teshima | |
| 5,920,443 A | 7/1999 | Ekhoff | |
| 5,947,608 A | 9/1999 | Kim | |
| 5,952,752 A | 9/1999 | Kim | |
| 5,956,204 A | 9/1999 | Dunfield et al. | |
| 5,969,448 A | 10/1999 | Liu et al. | |
| 5,980,113 A | 11/1999 | Grantz | |
| 5,988,887 A | 11/1999 | Lee | |
| 6,005,748 A | 12/1999 | Heine et al. | |
| 6,020,664 A | 2/2000 | Liu et al. | |
| 6,031,651 A | 2/2000 | Nakasugi | |
| 6,033,118 A | 3/2000 | Asai et al. | |
| 6,034,454 A | 3/2000 | Ichiyama | |
| 6,074,098 A | 6/2000 | Asai et al. | |
| 6,108,909 A | 8/2000 | Cheever et al. | |
| 6,121,703 A | 9/2000 | Kloeppel et al. | |
| 6,126,320 A | 10/2000 | Ichiyama | |
| 6,127,756 A | 10/2000 | Iwaki et al. | |
| 6,137,650 A | 10/2000 | Heine et al. | |
| 6,144,523 A | 11/2000 | Murthy et al. | |
| 6,154,339 A | 11/2000 | Grantz et al. | |
| 6,188,152 B1 | 2/2001 | Wakitani et al. | |
| 6,205,110 B1 | 3/2001 | Miyamoto et al. | |
| 6,208,050 B1 | 3/2001 | Fujii et al. | |
| 6,211,592 B1 | 4/2001 | Ichiyama | |
| 6,236,129 B1 | 5/2001 | Yamashita | |
| 6,292,328 B1 | 9/2001 | Rahman et al. | |
| 6,305,439 B1 | 10/2001 | Pool et al. | |
| 6,307,293 B1 | 10/2001 | Ichiyama | |
| 6,339,270 B1 | 1/2002 | Ichiyama | |
| 6,361,214 B1 | 3/2002 | Ichiyama | |
| 6,364,532 B1 | 4/2002 | Yoshikawa et al. | |
| 6,397,470 B1 | 6/2002 | Saichi et al. | |
| 6,402,383 B1 | 6/2002 | Parsoneault et al. | |
| 6,456,458 B1 | 9/2002 | Ichiyama | |
| 6,493,181 B1 | 12/2002 | Ichiyama | |
| 6,549,366 B1 | 4/2003 | Ichiyama | |
| 6,669,369 B1 | 12/2003 | Nottingham et al. | |
| 6,686,674 B2 * | 2/2004 | Ichiyama | 310/90 |
| 6,694,617 B2 | 2/2004 | Gredinberg et al. | |
| 6,712,513 B2 | 3/2004 | Tanaka et al. | |
| 6,750,571 B2 * | 6/2004 | Tominaga et al. | 310/12 |
| 6,799,892 B2 | 10/2004 | Leuthold et al. | |
| 6,828,709 B2 | 12/2004 | Grantz et al. | |
| 6,874,940 B2 | 4/2005 | Rahman et al. | |
| 6,989,888 B2 * | 1/2006 | Akutsu | 355/72 |
| 7,030,527 B2 * | 4/2006 | Tsuda et al. | 310/90 |
| 7,135,797 B2 * | 11/2006 | Khan et al. | 310/90 |
| 2003/0222523 A1 | 12/2003 | Wang et al. | |
| 2004/0104634 A1 * | 6/2004 | Nishimura et al. | 310/90 |
| 2004/0189122 A1 * | 9/2004 | Obata et al. | 310/90 |
| 2006/0238057 A1 | 10/2006 | Tamaoka et al. | |

FOREIGN PATENT DOCUMENTS

| | | |
|---|---|---|
| FR | 2278128 | 2/1976 |
| GB | 1324147 A | 7/1973 |
| GB | 1359548 A | 7/1974 |
| GB | 2298464 A | 9/1996 |
| JP | 55-088545 A | 7/1980 |
| JP | 58-005518 A | 1/1983 |
| JP | 58-050318 A | 3/1983 |
| JP | 59-028757 A | 2/1984 |
| JP | 60-018615 A | 1/1985 |
| JP | 61-112547 A | 5/1986 |
| JP | 61-140611 A | 6/1986 |
| JP | 62-037514 A | 2/1987 |
| JP | 62037514 | 2/1987 |
| JP | 62-140271 A | 6/1987 |
| JP | 63-087162 A | 4/1988 |
| JP | 63-100416 A | 5/1988 |
| JP | 63-241515 A | 10/1988 |
| JP | 63-241516 A | 10/1988 |

| | | |
|---|---|---|
| JP | 63-241517 A | 10/1988 |
| JP | 3202635 | 9/1991 |
| JP | 5-060134 A | 3/1993 |
| JP | 5-060135 A | 3/1993 |
| JP | 6-137320 | 5/1994 |
| JP | 6-221324 A | 8/1994 |
| JP | 62-33495 A | 8/1994 |
| JP | 6-284631 A | 10/1994 |
| JP | 06-315242 | 11/1994 |
| JP | 7-243438 A | 9/1995 |
| JP | 8-074841 A | 3/1996 |
| JP | 8-189525 A | 7/1996 |
| JP | 8-193618 A | 7/1996 |
| JP | 8-221896 A | 8/1996 |
| JP | 8-242550 A | 9/1996 |
| JP | 8-247137 A | 9/1996 |
| JP | 8-331796 A | 12/1996 |
| JP | 8-335366 A | 12/1996 |
| JP | 2560501 B2 | 12/1996 |
| JP | 9-017110 A | 1/1997 |
| JP | 9-025929 A | 1/1997 |
| JP | 9-046938 A | 2/1997 |
| JP | 9-063183 A | 3/1997 |
| JP | 9-079263 A | 3/1997 |
| JP | 9-166145 A | 6/1997 |
| JP | 9-189329 A | 7/1997 |
| JP | 9-200998 A | 7/1997 |
| JP | 9-217735 A | 8/1997 |
| JP | 2560501 | 10/1997 |
| JP | 10-009250 A | 1/1998 |
| JP | 2004-289881 * | 10/2004 |
| JP | 2005-45876 * | 2/2005 |
| WO | 03/100780 A1 | 12/2003 |
| WO | 03100780 | 12/2003 |

OTHER PUBLICATIONS

Non-Final Office Action Dated Dec. 31, 2003; U.S. Appl. No. 10/348,699; (Patent No. 6,828,709).

Notice of Allowance Dated May 5, 2004; U.S. Appl. No. 10/348,699; (Patent No. 6,828,709).

Non-Final Office Action Dated May 11, 2004; U.S. Appl. No. 10/340,048; STL3174.

Final Office Action Dated Nov. 24, 2004; U.S. Appl. No. 10/340,048; STL3174.

Advisory Action Dated Mar. 10, 2005; U.S. Appl. No. 10/340,048; STL3174.

Non-Final Office Action Dated 05106/2005; U.S. Appl. No. 10/340,048; STL3174.

Restriction / Election Requirement Office Action Dated Mar. 25, 2004; U.S. Appl. No. 10/340,048; STL3174.

* cited by examiner

MOTOR MAGNETIC FORCE ATTENUATOR

BACKGROUND

1. Field

Various examples described herein relate generally to methods and devices for regulating magnetic attraction between the magnet of a motor and the base of the motor, and in particular methods and devices for regulating magnetic attraction between the magnet and the base of a Fluid Dynamic Bearing (FDB) motor.

2. Description of Related Art

Rotary motors having small or very small profiles are often used to drive electronics equipment such as media drives (e.g., disk drives). Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft and a hub, to which one or more disks are attached, and a sleeve defining a bore for the shaft. Permanent magnets attached to the hub interact with a stator winding to rotate the hub and disk. In order to facilitate rotation, one or more bearings are usually disposed between the sleeve and the shaft.

Over the years, storage density has tended to increase, and the size of the storage system has tended to decrease. This trend has lead to greater precision and lower tolerance in the manufacturing and operating of magnetic storage disks. Accordingly, the interactions between adjacent components are of increasing importance.

One typical bearing assembly used in such storage systems includes a fluid dynamic bearing system. In a fluid dynamic bearing system, a lubricating fluid such as air or liquid provides a bearing surface between a fixed member of the housing and a rotating member of the disk hub. In addition to air, typical lubricants include gas, oil, or other fluids. Fluid dynamic bearings spread the bearing surface over a large surface area, as opposed to a ball bearing assembly, which comprises a series of point interfaces. This is desirable because the increased bearing surface reduces wobble or runout between the rotating and fixed members. Further, the use of fluid in the interface area imparts damping effects to the bearing, which helps reduce non-repeatable run-out.

Many fluid dynamic bearing motors, such as those used in hard disc drives, are subject to very limited space considerations. Thus, the magnet and the base of the motor may be positioned in relatively close proximity. When the base enclosure is made of a magnetically attractive material (e.g., a material that is magnetically permeable), this close proximity can result in attractive forces that may disrupt the smooth operation of the motor. For example, the magnetic attraction between the magnet and the base may be variable (e.g., due to variations in the distance between the base and the magnet) or it may be too powerful of an attractive force. In many motors the attractive force between the magnet and the base may also be used to preload a fluid dynamic thrust bearing, or any other thrust bearing (e.g., hydraulic, hydrostatic, spherical, conical, etc.). Thus, the magnetic force may be used to help keep the rotating portion of the motor balanced and positioned by regulating the motor bearings between the rotating region and the fixed region of the motor. Maintaining this bearing gap without excessive variation may be critical to the power, stiffness and reliability of the motor.

Accordingly, there is a need for devices, methods and systems for regulating the magnetic attraction between the motor magnet and the base region of the motor.

SUMMARY

Described herein are magnetic force attenuators, motors having magnetic force attenuators, and methods of using magnetic force attenuators to limit the magnetic attraction force between a magnet and a base region or other stationary member.

One variation of a motor having a magnetic force attenuator includes a stationary member with a base and a stator, a rotating assembly with a magnet and a magnetic force attenuator to attenuate the magnetic attraction force between the magnet and the base, and a fluid bearing to support rotation of the rotating assembly relative to the stationary member. The magnetic attraction force between the magnet and the base may impose a constant load on the fluid dynamic bearing to counterbalance a bearing thrust force. The magnetic force attenuator may comprise a material of high magnetic permeability, such as magnetic steel.

In some variations, the magnetic force attenuator contacts a surface of the magnet. For example, the magnetic force attenuator may at least partially cover a surface of the magnet facing or adjacent to the base. The magnetic force attenuator may comprise any appropriate shape. For example, the magnetic force attenuator may be ring shaped.

In use, the magnetic force attenuator may contain a portion of the magnetic flux from the magnet providing a magnetic circuit for the flux. For example, the magnetic force attenuator may attenuate the magnetic flux between the magnet and the base.

The fluid bearing of the motor may be any appropriate bearing. Thus, the fluid bearing may comprise a single thrust bearing, a dual thrust bearing, or a conical bearing. For example, the bearing may comprise a fluid dynamic thrust bearing, a pneumatic thrust bearing, a hydraulic thrust bearing, a hydrostatic thrust bearing, a spherical thrust bearing, etc. In general a fluid dynamic bearing comprise grooves. In some variations, the magnetic force attenuator does not substantially attenuate the flux between the magnet and the stator. The magnetic attraction force between the magnet and the base, and the magnetic attraction force between the magnet and the stator, may be attenuated by the attenuator to counterbalance a thrust force from the fluid dynamic bearing.

In other variations, the magnetic force attenuator may be attached to the rotating assembly in near proximity to the magnet so that a low magnetic permeability material is interposed between the magnet and the magnetic force attenuator. For example, the motor may comprise an air gap between the magnet and the magnetic force attenuator.

Also described herein are motors having a sleeve, an axial shaft supported for rotation within the sleeve (the shaft may support a hub at one end, to rotate with the shaft), a stator supported on an outer surface of the sleeve, a magnet supported on an inner surface of the hub, a base supporting the sleeve comprising a magnetic material, and a magnetic force attenuator to attenuate the magnetic flux between the magnet and the region of the base axial to the magnet. The shaft may be supported for rotation relative to the sleeve by a fluid bearing and by fluid in a gap between the shaft and the sleeve.

As should be apparent to one of skill in the art, magnetic force attenuators may also be used in motors configured to have fixed shafts.

In some variations of the motor, the shaft is axially biased by a force established by the magnetic flux between the magnet and the region of the base spaced apart from the magnet. The magnetic force attenuator may be mounted to the surface of the magnet so that the magnetic force attenuator does not attenuate the flux between the magnet and the stator. The magnetic force attenuator may completely cover a surface of the magnet adjacent to the base.

The present invention and its various embodiments are better understood upon consideration of the detailed description below in conjunction with the accompanying drawings and claims.

BRIEF DESCRIPTION OF THE DRAWINGS

For a fuller understanding of aspects and examples disclosed herein, reference is made to the accompanying drawings in the following description.

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in a variety of motors, including motors for use in disk storage drives. Motors for disk storage drives may be designed and may operate in a number of ways. The exemplary motors and other exemplary subject matter provided herein are for illustrating various aspects and are not intended to limit the range of motors and devices in which such examples and aspects may be applied.

Motors, including fluid dynamic motors, typically include a rotating portion having a magnet that may be driven in rotation by a stator connected to a base region. The base is fixed relative to the rotating position, and one or more bearings may be positioned between the rotating region and the fixed region to stabilize the rotating region as it rotates. Described herein are magnetic force attenuators to attenuate the magnetic force between the magnet and the base region. Motors The magnetic force attenuators described herein may be used to regulate the magnetic flux produced by the magnet (e.g., the magnet which interacts with the stator) of any appropriate motor. In particular the motor may be a fluid dynamic bearing ("FDB") motor. Furthermore, the motor may comprise any appropriate configuration, including but not limited to those described herein.

Figure 1:
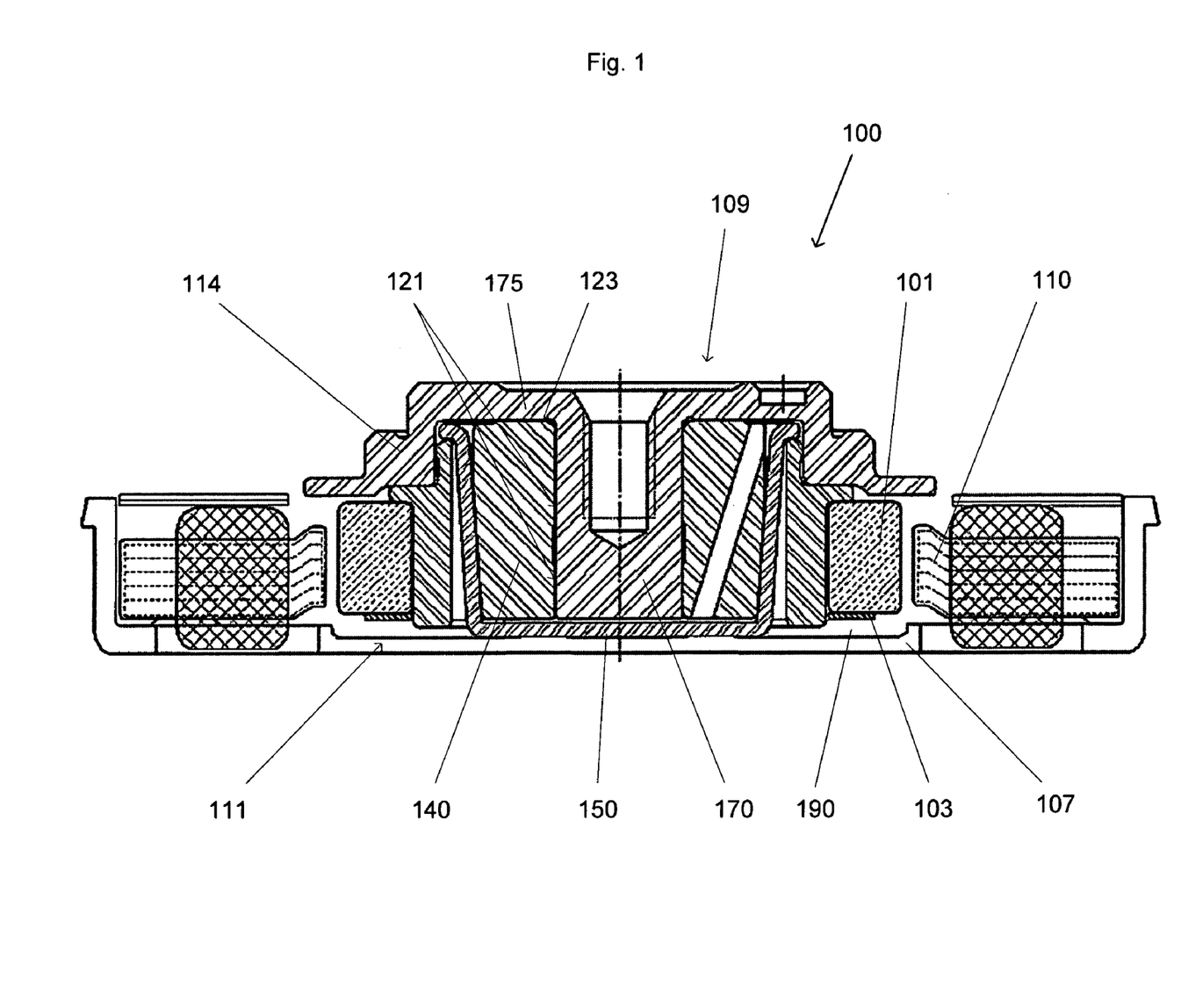
FIG. 1 illustrates a cross-sectional view of one example of a motor as described herein.

FIG. 1 shows a cross section an FDB motor with a magnetic force attenuator ("attenuator") as described herein. In this example, motor 100 generally includes a stationary member 111 including a base 107 that is connected to a sleeve 140 and a cup (encapsulating cup) 150. A stator 110 is fixed to the base 107. The stationary member 111 does not move relative to the rotating assembly 109 of the motor 100.

The motor 100 of FIG. 1 further includes a rotating assembly 109 that is rotatably mounted within the sleeve 140 and generally including a hub 114 mounted to or integral with the shaft 170. The rotating assembly also includes one or more magnets 101 that may be mounted to the hub 114. Furthermore, fluid dynamic bearings may be located at any appropriate location between the rotating assembly 109 and the stationary member 111. In FIG. 1, three fluid dynamic bearings are shown. Two of the fluid dynamic bearings 121 are formed between an inner radial surface of sleeve 140 and the outer radial surface of the shaft 170. One or both of these radial surfaces may include circumferentially disposed groove regions forming the bearings. Groove regions may be asymmetrical and may create a net thrust (not shown in FIG. 1). For example, a net thrust could result from a conical bearing (e.g., if the shaft or a portion of the shaft were conical), or if an asymmetric hydraulic pressure is generated by the bearings. In general, force from the thrust bearing may be counterbalanced, for example, by the magnetic attractive force between the magnet 101 and the base 107. Any appropriate fluid dynamic bearing (e.g., having any appropriate shape, fluid, or position) may be used with the motors described herein. For example, the fluid bearings may comprise a single thrust bearing, a dual thrust bearing, or conical bearings. Examples of fluid dynamic bearings may be found, for example, in U.S. Pat. No. 4,200,344; U.S. Pat. No. 4,798,476; U.S. Pat. No. 5,089,732; U.S. Pat. No. 5,112,141; U.S. Pat. No. 5,723,927; U.S. Pat. No. 5,914,832; U.S. Pat. No. 6,034,454; U.S. Pat. No. 6,188,152; U.S. Pat. No. 6,211,592; U.S. Pat. No. 6,364,532; U.S. Pat. No. 5,664,889; U.S. Pat. No. 6,005,748; U.S. Pat. No. 6,121,703; U.S. Pat. No. 6,137,650; U.S. Pat. No. 6,402,383; U.S. Pat. No. 6,669,369; U.S. Pat. No. 6,694,617; U.S. Pat. No. 6,799,892; U.S. Pat. No. 6,874,940; and U.S. Pat. No. 6,828,709, all of which are herein incorporated by reference in their entirety.

Another fluid dynamic bearing 123 is also shown in FIG. 1, formed between the sleeve 140 and the thrust plate 175 to form a thrust bearing. In FIG. 1, this bearing gives rise to (contributes to) a net thrust that may be counterbalanced (at least in part) by the magnetic attraction force between the magnet 101 and the base 107. Any appropriate number of fluid dynamic bearings may be used, and any of these fluid dynamic bearings may generate thrust to help position and provide stiffness to the motor 100.

The stator 110, when energized, communicates with the magnet 101 or magnets) associated with hub 114 and induces rotation of hub 114 within the sleeve 140 (e.g., about stationary member 111). Stator 110 comprises a plurality of "teeth" formed of a magnetic material where each of the teeth is wound with a winding or wire.

This particular example includes a magnetically biased motor. In particular, to establish and maintain pressure counterbalancing the bearings (e.g., thrust bearings), and to bias the rotating assembly, a constant force magnetic circuit may be provided comprising magnet 101 supported on the rotating assembly (here mounted on hub 114), and located across a gap from a magnetically permeable base 107. In some variations, the entire base is a magnetically permeable material. In some variations, the base comprises a magnetically permeable material, such as a steel ring (not shown) supported on the stationary assembly. Other magnetic circuits or configurations are possible.

The magnet 101 may be any appropriate magnet or any number of magnets. The magnet is typically separated from the base (or a region of the base) by a gap 190. The gap may be of constant or variable distance, and may be an air gap.

Furthermore, any appropriate configuration of motor may be used with the magnetic force attenuators described herein, including motors with additional features or components or motors in which features of components have been combined.

Magnetic Force Attenuators

Any appropriate magnetic force attenuator may be used to attenuate the magnetic attraction force between the magnet and the base. As described above, the magnet may exert a magnetic attraction force to the base (or a portion of the base) that comprises a magnetically permeable material. The magnetic force attenuator is generally mounted onto the same assembly as the magnet (e.g., the rotating assembly), so that it may control or regulate the magnetic flux originating from the magnet. Thus, the magnetic force attenuator may be configured in any manner appropriate to modulate or attenuate the magnetic attraction between the base (or any other region of the motor) and the magnet.

The magnetic force attenuator may comprise any appropriate material for attenuating the magnetic force of the magnet, such as a material having high magnetic permeability. As referred to herein, magnetic permeability generally refers to the affinity of a material to conduct or carry magnetic flux (e.g., the preferred pathway for magnetic flux). Examples of materials having a high magnetic permeability that may be suitable include, but are not limited to, metals such as metallics (e.g., low carbon steel, silicon steel, ferritic stainless steel, etc.), ferrites (e.g., oxides, and some ceramics, etc), and the like. Thus, the magnetic force attenuator may provide a pathway into which the magnetic flux from the magnet may be preferentially contained. Thus, the magnetic force attenuator may be chosen of a material having an appropriate permeability and flux saturation level so as to attenuate the magnetic attraction force between the magnet and the base by the desired amount.

The magnetic force attenuator may be of any appropriate shape, size and location. In some variations, the magnetic force attenuator is in direct contact with the magnet. For example, the magnetic force attenuator may be directly attached a region of the magnet that is closest to the base (e.g., a portion of the base with the greatest magnetic attraction force to the magnet). In some variations, the magnetic force attenuator, or a region of the magnetic force attenuator, is separated from the magnet by a gap. This gap may comprise an air gap. The magnetic force attenuator may be attached to the magnet (or near the magnet) magnetically, or by using any appropriate adhesive or other holdfast, including screws, clips, etc.

Figure 2:
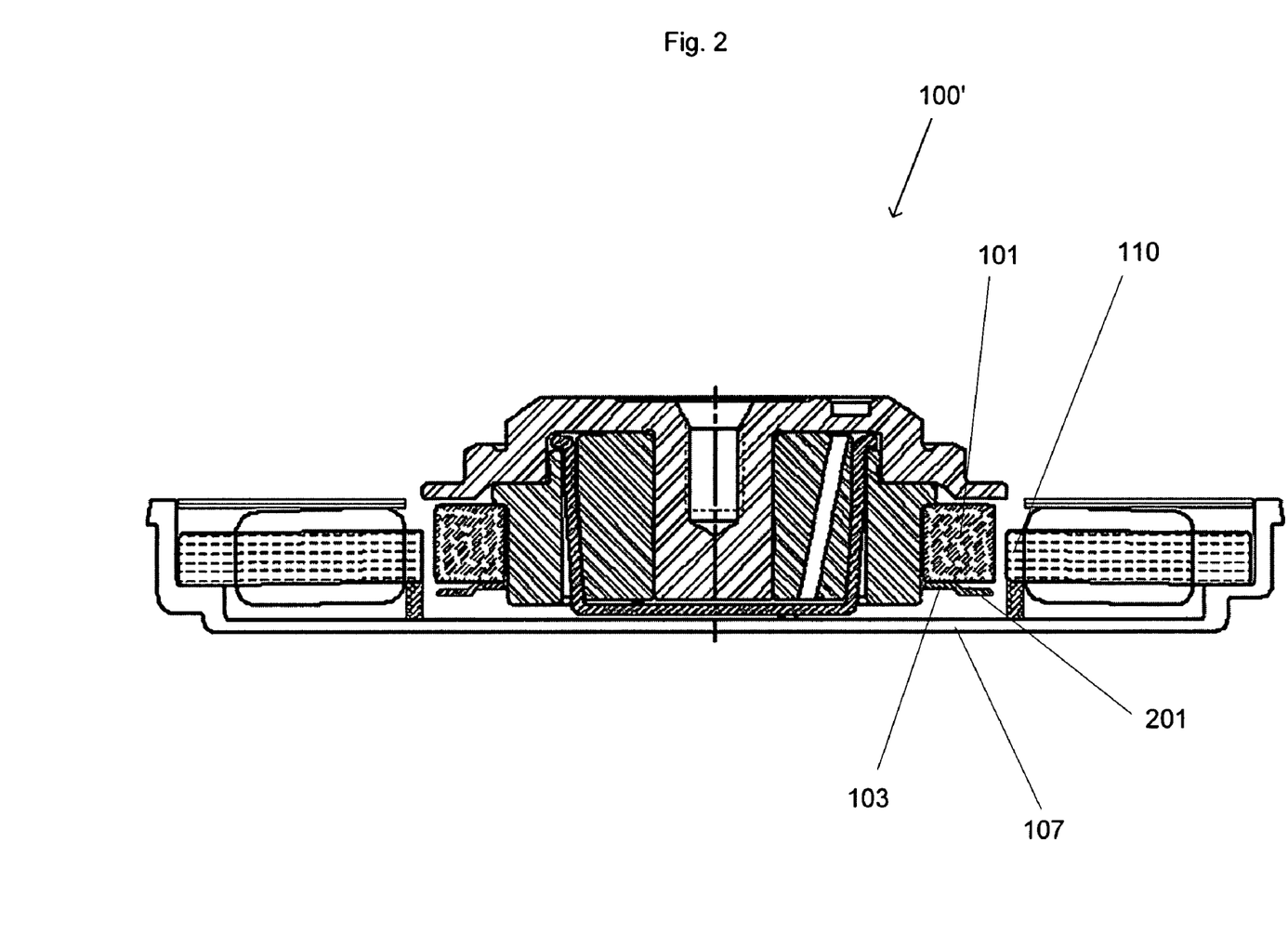
FIG. 2 illustrates a cross-sectional view of another example of a motor as described herein.

FIG. 1 shows a magnetic force attenuator 103 that is directly attached to the magnet 101. Another variation of a magnetic force attenuator is shown in FIG. 2, in which the lower surface of the magnet 101 that is directly opposite from the base 107 is covered by a magnetic force attenuator 103. Part of the magnetic force attenuator 103 is in direct contact with the magnet 101, and part of the magnet force attenuator is separated from the magnet by an air gap 201. The magnetic force attenuator shown in FIG. 2 may attenuate some of the attractive force between the magnet 101 and the base 107. In general, the amount of magnetic force attenuated by the magnetic force attenuator may depend upon the material (e.g., the magnetic properties of the material, including magnetic permeability and magnetic saturation), the size or thickness (e.g., how much material is present in the magnetic force attenuator) and the location of the magnetic force attenuator in relation to the magnet and the base.

In some variations, the magnetic force attenuator attenuates more or less of the magnetic attraction force between the magnet and the base in proportion to the amount of magnet surface that the magnetic force attenuator covers. In particular, the magnetic force attenuator may cover more or less of the surface of the magnet facing the base. For example the magnetic force attenuator may cover 10%, 20%, 25%, 50%, 75% or 100% of the surface of the magnet closest to the base.

The amount of attenuation by the magnetic force attenuator may be calculated or determined empirically by any appropriate method. Thus, given the material, the shape and the location of the magnetic force attenuator, as well as the strength of the magnet and its proximity to the base, it is possible to calculate the magnetic flux seen by the base. Thus a magnetic force attenuator may be chosen based on analytical procedures for any motor. Alternatively, a magnetic force attenuator may be chosen based on an empirical determination of the amount of attenuation between the magnet and the base.

Figure 3:
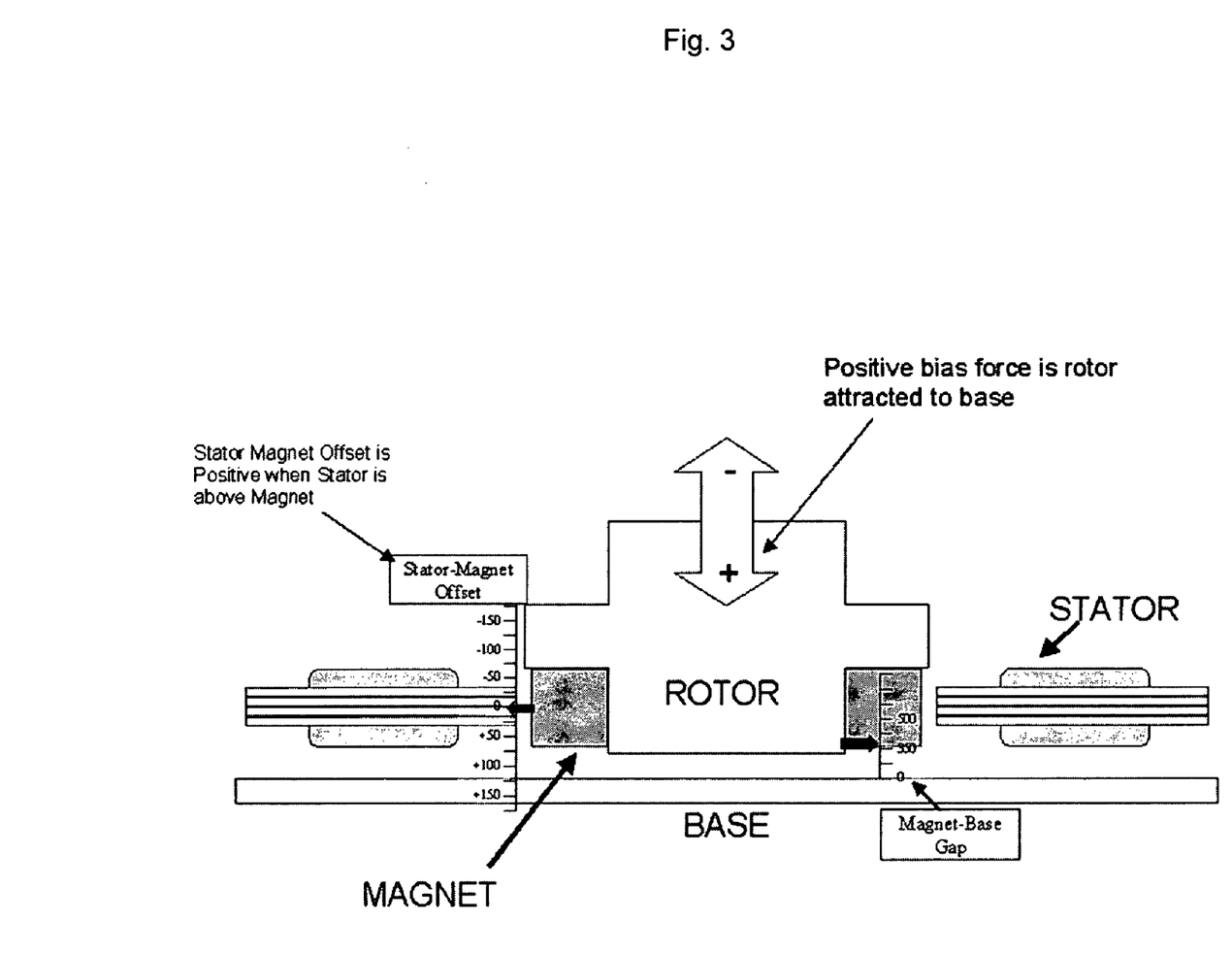
FIG. 3 shows a schematic diagram of a method of measuring the bias force between a magnet and a region of the base.
Figure 4:
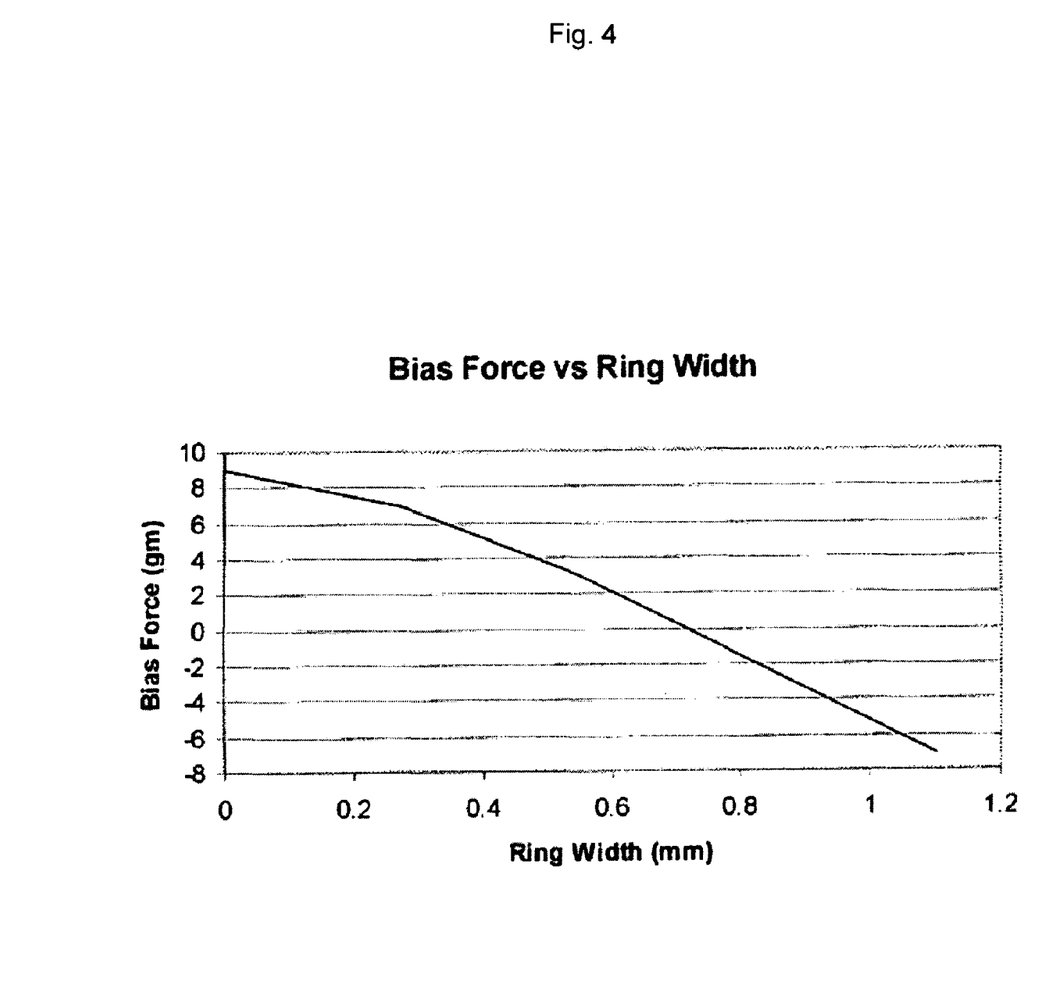
FIG. 4 shows a graph of the effect of increasing coverage of a magnet by a magnetic force attenuator on bias force.

FIG. 3 schematically illustrates one way in which the magnetic bias force between the magnet and the base may be empirically determined. In FIG. 3, the bias force is measured for different configurations of the motor. For example, the bias force may be determined for magnet/stator offsets, as well as different magnet/base distances. The arrow at the top of the rotor represents a force gauge from which the resulting forces may be measured. Thus, as illustrated in FIG. 3, the change in the bias force due to different magnetic force attenuators may be experimentally determined. A magnetic force attenuator (not shown in FIG. 3) may be used with the experimental set up shown in FIG. 3. The change in bias force is representative of the amount of attenuation due to the magnetic force attenuator. FIG. 4 shows an example of the different amounts of attenuation as the magnetic force attenuators change size and relative coverage of the magnet.

In FIG. 4, the surface of the magnet facing the base is approximately 1.2 mm wide. The magnet comprises a circular magnet connected to the rotating assembly, as shown in cross-section in FIG. 1. Magnetic force attenuators having different diameters (e.g., covering more or less of the surface of the magnet facing the base) attenuated the magnetic attraction force to a degree that is proportional to the amount of magnet surface covered. The magnetic force attenuators used in this example comprise ring-shaped pieces of magnetic steel having increasing outer diameters, and therefore increasing coverage of the surface of the magnet facing the base. As more of the magnet surface was covered, more of the magnetic force was attenuated, as reflected by the decrease in bias force measured. Without a magnetic force attenuator, the nominal bias force was approximately 9 grams. With nearly complete coverage of the surface of the magnet facing the base (e.g., using a magnetic force attenuator ring of width 1.1 mm), the bias force was −7 grams. The −7 gram force present after complete coverage of the lower surface of the magnet by the magnetic force attenuator is a result of the attraction force from the offset of the magnet relative to the steel stator.

The thickness of the magnetic force attenuator may also be selected to modify the amount of attenuation between the magnet and the base. For example, magnetic force attenuators which are thinner may attenuate less than thicker magnetic force attenuators, especially when the magnetic force attenuator is thin enough to be magnetically saturated.

In some variations, the magnetic force attenuator does not substantially attenuate the magnetic attraction force (e.g., flux) between the magnet and the stator. Thus, the position of the magnetic force attenuator may be chosen so that the magnetic force attenuator does not attenuate the force between the stator and the magnet even while regulating the magnetic attraction forces between the magnet and the base. For example, the magnetic force attenuator may be placed on a surface of the magnet facing the base that is distal from the stator. In such cases, the magnetic force attenuator does not inhibit the ability of the stator to motivate the magnet and thereby rotate the motor.

The size, shape, and material chosen for the magnetic force attenuator may be chosen based on the amount of attenuation desired to counterbalance the amount of thrust force present in the motor's bearing. As illustrated in FIGS. 3 and 4, a motor may have a thrust force directed away from the base which may be counterbalanced by the magnetic attraction force between the magnet and the base. This thrust force may be constant or variable. In some variations, the thrust force originates from one or more fluid dynamic bearings. Thus, the magnetic force attenuator may regulate the amount of magnetic attraction force used to counterbalance this net thrust.

The magnetic force attenuator may be any appropriate shape. Thus, the magnetic force attenuator may comprise a shape that is complementary to one or more of the surfaces of the magnet (or a portion of a surface of the magnet). For example, the magnetic force attenuator may comprise a ring shape that may be particularly effective when the magnet is ring shaped (or where multiple magnets may be connected into a ring). The magnetic force attenuator may also comprise one or more discrete regions that may be connected or unconnected. In some variations, the magnetic force attenuator is a continuous, flat structure. In some variations, the magnetic force attenuator includes openings or gaps. In some variations, the magnetic force attenuator comprises regions of varying thickness.

Figure 5A:
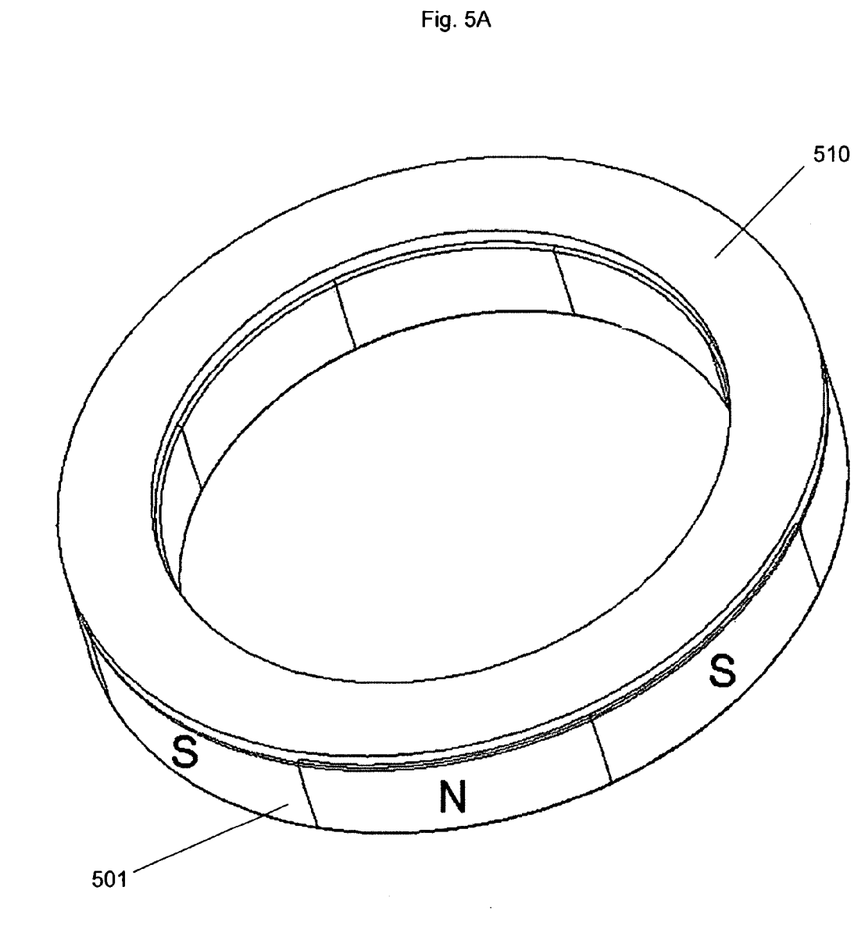
FIG. 5A to 5C show perspective views of the bottom of a magnet having different magnetic force attenuators attached thereto.
Figure 5B:
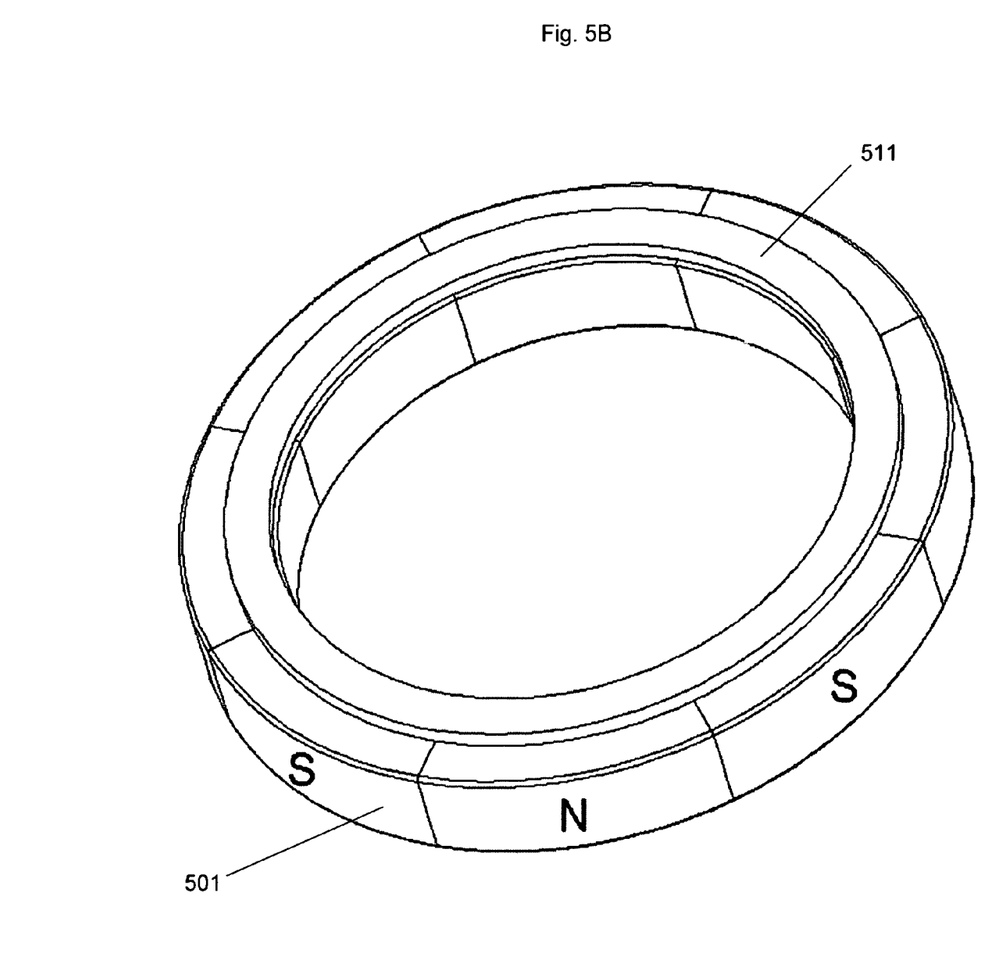
Figure 5C:
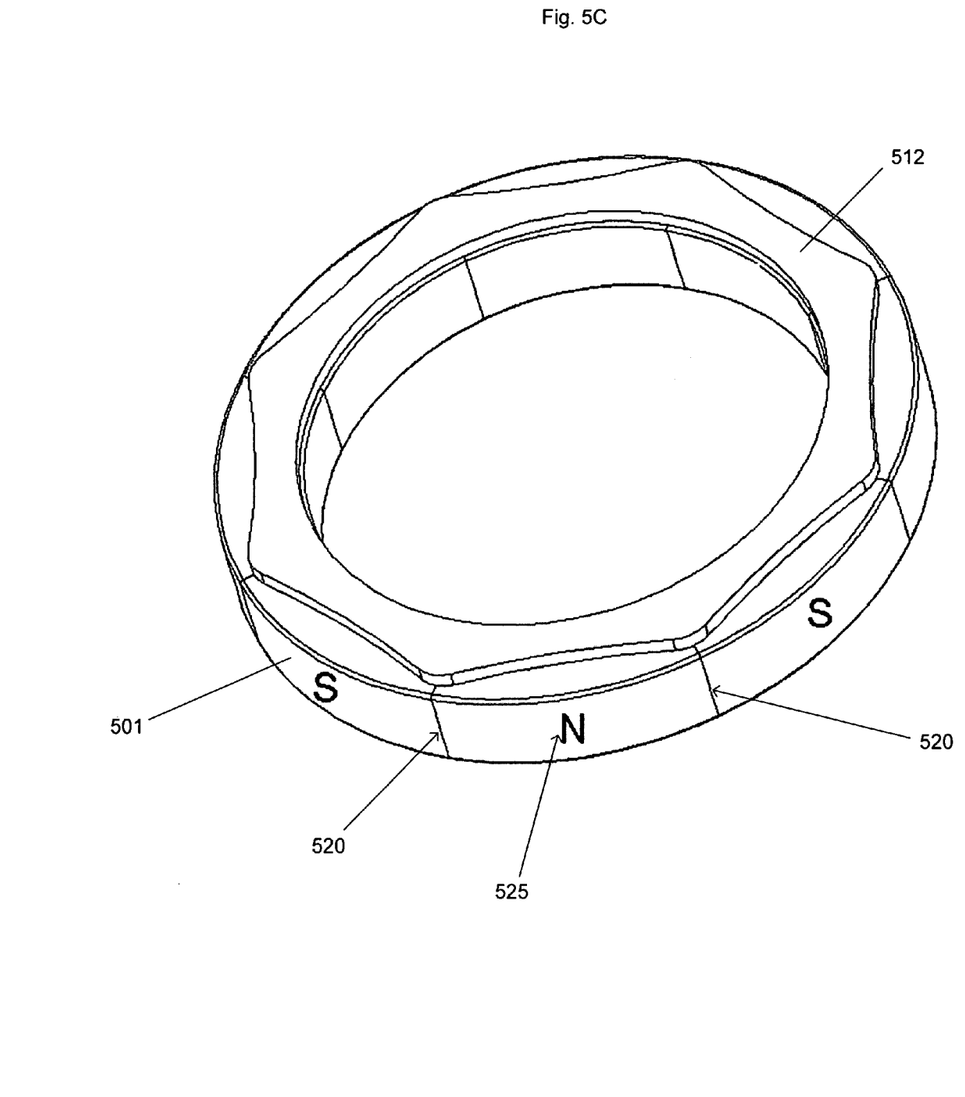

FIGS. 5A to 5C show perspective views of different variations of magnetic force attenuator rings covering one type of magnet. The magnet 501 comprises eight different segments (or regions) each having a magnetic polarity. For example, in the figures, the magnetic polarity is roughly indicated by "N" (north) and "S" (south). In each of FIGS. 5A to 5C, a magnetic force attenuator 510, 511, 512 is shown attached to the surface of the magnet, as previously described. In FIG. 5A, the magnetic force attenuator 510 comprises a large ring that covers the entire surface of the magnet. Thus, if this arrangement is used in a motor (e.g., as shown in FIGS. 1 and 2), the magnetic force attenuator 510 may effectively attenuate nearly all of the magnetic attraction force between the magnet and the base. The only substantial bias force left would be generated by the attraction between the magnet and the steel portion of the stator. Although this magnetic force attenuator may prevent all (or most) of the magnetic attraction between the magnet and the base, the magnetic force attenuator may also divert some of the magnetic flux that might otherwise contribute to the generation of motor torque between the magnet and the stator.

FIG. 5B shows a smaller magnetic force attenuator 511 that covers only a portion of the magnet. In particular, the magnetic force attenuator 511 covers a portion of the magnet (the inner diameter of the magnet) that is located distally from the stator (not shown). This configuration attenuates less of the magnetic attraction force between the magnet and the base, but does not substantially affect the amount of flux linking between the magnet and the stator.

FIG. 5C shows a magnetic force attenuator 512 having a lobe pattern that aligns with the magnetic pole transitions of the magnet. This configuration may more effectively limit magnetic flux between the magnet and the base without substantially reducing the magnetic flux between the magnet and the stator. For example, radially oriented magnetic flux (e.g., flux between the magnet and the stator) emanating from the magnet occurs primarily between the pole transitions 520, near the pole center 525. Radially oriented magnetic flux links to the stator, and thus drives rotation of the motor. Magnetic flux at the pole transitions 520 is typically oriented tangentially, and therefore links less with the stator, but more with the base. Thus, the lobe-pattern of the magnetic force attenuator 512 in FIG. 5C may selectively attenuate magnetic force between the magnet and the base to preserve motor performance.

The magnetic force attenuator may create one or more magnetic circuits to direct magnetic flux. Creating a pathway for magnetic flux within the magnetic force attenuator may thereby decrease or modify the magnetic attraction force between the magnet and the base of the motor. The magnetic force attenuator may comprise shapes or configurations forming distinct magnetic circuits.

Various motor and FDB aspects have been illustrated and described herein. It should be recognized that exemplary spindle motor 200 and motor 400 are shown for illustrative purposes only and other motor designs are contemplated and possible for use with exemplary aspects described. For example, U.S. Pat. Nos. 6,154,339, 6,828,709, 6,005,748, and 6,137,650, all of which are hereby incorporated by reference as if fully set forth herein, describe additional motor configurations that may be used with various aspects described herein. Also, it should be understood that certain components have been separately identified herein, but such identification does not imply that such components must be separately formed from other components. Similarly, components identified herein may be subdivided into sub-components in other designs. Additionally, illustrated features such as recirculation channels, bearing surfaces, pumping grooves, and the like may be disposed additionally or differently than presented in aspects herein.

Other modifications and variations would also be apparent to those of ordinary skill in the art from the exemplary aspects presented. Additionally, particular examples have been discussed and how these examples are thought to address certain disadvantages in related art. This discussion is not meant, however, to restrict the various examples to methods and/or systems that actually address or solve the disadvantages.

What is claimed is:

1. A motor comprising:
    a stationary member having a magnetically permeable base, and a stator;
    a rotating assembly having an annular magnet and an annular magnetic force attenuator to attenuate the magnetic attraction force between the annular magnet and the stationary member;
    wherein the annular magnetic force attenuator comprises a non-circumferential perimeter adjacent to the stator;
    wherein at least a portion of the magnetic force attenuator is in near proximity to the magnet and a low magnetic permeability material is interposed between the magnet and the magnet force attenuator; and
    a fluid bearing to support rotation of the rotating assembly relative to the stationary member.

2. The motor of claim 1, wherein the magnetic force attenuator comprises a material of high magnetic permeability.

3. The motor of claim 2, wherein the permeable material comprises a magnetic steel.

4. The motor of claim 1, wherein the magnetic force attenuator contacts a portion of a surface of the magnet.

5. The motor of claim 1, wherein the magnetic force attenuator at least partially covers a surface of the magnet adjacent to the base.

6. The motor of claim 1, wherein the magnetic force attenuator comprises steel.

7. The motor of claim 1, wherein the magnetic force attenuator contains a portion of the magnetic flux from the magnet.

8. The motor of claim 7, wherein the magnetic attraction force between the magnet and the base and the magnetic attraction force between the magnet and the stator are attenuated by the attenuator to counterbalance a thrust force from the fluid bearing.

9. The motor of claim 1, wherein the magnetic force attenuator attenuates the magnetic flux between the magnet and the base.

10. The motor of claim 1, wherein the fluid bearing comprises a single thrust bearing.

11. The motor of claim 1, wherein the fluid bearing comprises a fluid dynamic thrust bearing.

12. The motor of claim 1, wherein the magnetic force attenuator does not substantially attenuate the flux between the magnet and the stator.

13. The motor of claim 1, wherein said annular magnetic force attenuator comprises a lobed pattern.

14. A motor comprising:
a sleeve;
an axial shaft supported for rotation within the sleeve, the shaft supported at one end by a hub, to rotate with the shaft;
an annular magnet connected with the hub;
a base supporting the sleeve, and comprising a magnetic material;
a stator connected with the base; and
an annular magnetic force attenuator to attenuate the magnetic flux between the magnet and the region of the base axial to the magnet,
wherein the annular magnetic force attenuator comprises a non-circumferential perimeter adjacent to the stator,
wherein at least a portion of the magnetic force attenuator is in near proximity to the magnet and a low magnetic permeability material is interposed between the magnet and the magnetic force attenuator,
and wherein the shaft is supported for rotation relative to the sleeve by a fluid bearing and by fluid in a gap between the shaft and the sleeve.

15. The motor of claim 14, wherein the magnetic force attenuator comprises magnetic steel.

16. The motor of claim 14, wherein the magnetic force attenuator contacts a portion of the surface of the magnet.

17. The motor of claim 14, wherein the magnetic force attenuator is mounted to the surface of the magnet so that the magnetic force attenuator does not attenuate the flux between the magnet and the stator.

18. The motor of claim 14, wherein the magnetic force attenuator completely covers a surface of the magnet adjacent to the base.

19. The motor of claim 14, wherein the magnetic force attenuator comprises a lobed pattern.

20. A motor comprising:
a magnetically permeable base;
a stator;
a rotating assembly having a rotor supported by a bearing and an annular magnet presented with the rotor, said magnet having an outer face opposing the stator and an end face opposing the base, wherein a gap is formed between the end face and the base; and
an annular magnetic force attenuator substantially registering with the annular magnet and disposed within the gap, wherein a diameter of the magnetic force attenuator, adjacent to the stator, is larger than an average of outer and inner diameters of the magnet,
wherein the magnetic force attenuator is in a lobed pattern;
wherein a magnetic attraction force between the annular magnet and the magnetically permeable base imposes a substantially constant load on the bearing to counterbalance a bearing thrust force.

21. The motor of claim 20, wherein the magnetic force attenuator is at least partially in contact with the end face.

22. The motor of claim 20, wherein the diameter of the magnetic force attenuator adjacent to the stator is substantially equal to the diameter of the magnet adjacent to the stator.

23. The motor of claim 20, wherein an inner portion of the magnetic force attenuator is operably coupled with the rotor.

24. The motor of claim 20, wherein the bearing is a fluid bearing.

25. A motor comprising:
a stationary member having a magnetically permeable base, and a stator;
a rotating assembly having an annular magnet and an annular magnetic force attenuator to attenuate the magnetic attraction force between the annular magnet and the stationary member;
wherein the magnetic force attenuator is in a lobed pattern; and
a fluid bearing to support rotation of the rotating assembly relative to the stationary member, wherein the magnetic attraction force between the annular magnet and the base imposes a substantially constant load on the fluid bearing to counterbalance a bearing thrust force.

26. The motor of claim 25, wherein portions of the magnetic force attenuator cover a larger portion of the magnet than other portions.

27. The motor of claim 25, wherein the magnet is comprised of a plurality of magnets and the lobes of the magnetic force attenuator are aligned with the magnetic pole transitions of the magnets.

28. The motor of claim 25, wherein the number of lobes is equal to the number of poles in the magnet.

29. The motor of claim 25, wherein the magnetic force attenuator comprises steel.

30. The motor of claim 25, wherein the magnetic force attenuator comprises magnetic steel.

31. A motor comprising:
a stationary member having a magnetically permeable base, and a stator;
a rotating assembly having an annular magnet and an annular magnetic force attenuator to attenuate the magnetic attraction force between the annular magnet and the stationary member;
wherein the annular magnetic force attenuator comprises a non-circumferential perimeter adjacent to the stator;
wherein at least a portion of the magnetic force attenuator is in near proximity to the magnet; and
a fluid bearing to support rotation of the rotating assembly relative to the stationary member.

32. The motor of claim 31, wherein the magnetic force attenuator contacts a portion of a surface of the magnet.

33. The motor of claim 31, wherein the magnetic force attenuator at least partially covers a surface of the magnet adjacent to the base.

34. The motor of claim 31, wherein the fluid bearing comprises a single thrust bearing.

35. The motor of claim 31, wherein the fluid bearing comprises a fluid dynamic thrust bearing.

36. A motor comprising:
a magnetically permeable base;
a stator;
a rotating assembly having a rotor supported by a bearing and an annular magnet, said magnet having an outer face opposing the stator and an end face opposing the base, wherein a gap is formed between the end face and the base; and
an annular magnetic force attenuator is in near proximity to the annular magnet and disposed within the gap,
wherein the magnetic force attenuator is in a lobed pattern;
wherein a magnetic attraction force between the annular magnet and the magnetically permeable base imposes a substantially constant load on the bearing to counterbalance a bearing thrust force.

37. The motor according to claim 36, wherein the magnetic force attenuator is at least partially in contact with the end face.

38. The motor according to claim 36, wherein an inner portion of the magnetic force attenuator is operably coupled with the rotor.

39. The motor according to claim 36, wherein the bearing is a fluid bearing.

* * * * *